(12) United States Patent
Boodaghians et al.

(10) Patent No.: US 9,540,107 B2
(45) Date of Patent: Jan. 10, 2017

(54) SYSTEMS AND METHODS FOR TREATING GREY WATER ON-BOARD PASSENGER TRANSPORT VEHICLES

(71) Applicant: MAG AEROSPACE INDUSTRIES, INC., Carson, CA (US)

(72) Inventors: Razmik B. Boodaghians, Glendale, CA (US); Kevin Huang, Los Angeles, CA (US); Christoph Goeschel, Seattle, WA (US); Christina Ortolan, Long Beach, CA (US); Vikram Chauhan, Redondo Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 671 days.

(21) Appl. No.: 13/942,856

(22) Filed: Jul. 16, 2013

(65) Prior Publication Data
US 2014/0021112 A1    Jan. 23, 2014

Related U.S. Application Data

(60) Provisional application No. 61/672,826, filed on Jul. 18, 2012.

(51) Int. Cl.
*C02F 1/00*    (2006.01)
*C02F 9/00*    (2006.01)
(Continued)

(52) U.S. Cl.
CPC .......... *B64D 11/02* (2013.01); *B01D 35/1573* (2013.01); *C02F 1/008* (2013.01); *C02F 9/00* (2013.01);
(Continued)

(58) Field of Classification Search
CPC ............. C02F 1/001; C02F 1/008; C02F 1/32; C02F 1/44; C02F 1/725; C02F 3/04; C02F 9/00; C02F 2103/002; C02F 2103/44; C02F 2201/001; C02F 2301/03; C02F 2301/043; C02F 2303/02; C02F 2303/32; C02F 2209/005; C02F 2209/006; C02F 2209/42; B64D 11/02; B64D 11/04; B01D 17/12; B01D 36/00; B01D 36/02; B01D 36/04; B01D 2201/16; B01D 2201/265; B01D 29/60; B01D 29/605; B01D 35/02; B01D 35/14; B01D 35/157; B01D 35/1573; E03D 5/00; E03D 5/003; E03D 5/01; E03D 5/016; Y02T 50/46

(Continued)

(56) References Cited

U.S. PATENT DOCUMENTS

| | | | |
|---|---|---|---|
| 4,871,452 A | 10/1989 | Kohler | |
| 6,007,025 A * | 12/1999 | Coughren | B64D 11/02 |
| | | | 105/329.1 |

(Continued)

FOREIGN PATENT DOCUMENTS

WO    2010058187 A2    5/2010

OTHER PUBLICATIONS

International Search Report and Written Opinion dated Sep. 27, 2013 in Application No. PCT/US2013/050608.
(Continued)

*Primary Examiner* — Joseph Drodge
(74) *Attorney, Agent, or Firm* — Kilpatrick Townsend & Stockton LLP; Dean W. Russell; Kristin M. Crall

(57) ABSTRACT

Embodiments of the present invention provide a system to direct water flow through a lavatory and to cleanse grey water through a series of treatment steps. The water may then be re-directed to the faucet for re-use in hand washing or other potable water use or to the toilet for flush water. The
(Continued)

treatment steps are altered, depending upon the ultimate use of the water, as flush water need not be treated to the same level as potable water. The system may also function via a cascade of logic commands given by a series of electronic controllers, valves, and sensors which are fine-tuned to supply enough water to each component of the system.

12 Claims, 4 Drawing Sheets

(51) Int. Cl.
    *B01D 35/157*      (2006.01)
    *B01D 35/02*      (2006.01)
    *B01D 29/60*      (2006.01)
    *B64D 11/02*      (2006.01)
    *E03D 5/01*      (2006.01)
    *E03D 5/00*      (2006.01)
    *C02F 1/32*      (2006.01)
    *C02F 1/44*      (2006.01)
    *C02F 1/72*      (2006.01)
    *C02F 103/00*      (2006.01)
    *E03B 1/04*      (2006.01)
    *C02F 3/04*      (2006.01)

(52) U.S. Cl.
    CPC ............... *E03D 5/003* (2013.01); *C02F 1/001* (2013.01); *C02F 1/32* (2013.01); *C02F 1/44* (2013.01); *C02F 1/725* (2013.01); *C02F 3/04* (2013.01); *C02F 2103/002* (2013.01); *C02F 2201/001* (2013.01); *C02F 2303/02* (2013.01); *E03B 2001/045* (2013.01); *Y02T 50/46* (2013.01); *Y02W 10/15* (2015.05)

(58) Field of Classification Search
    USPC ..... 4/321, 650, 653; 210/86, 96.2, 102, 103, 210/104, 167.31, 241, 257.1, 259; 244/129.1
    See application file for complete search history.

(56) References Cited

U.S. PATENT DOCUMENTS

| | | | | |
|---|---|---|---|---|
| 8,043,500 | B2 * | 10/2011 | Murg | C02F 1/78 210/192 |
| 8,141,185 | B2 | 3/2012 | Hoffjann | |
| 8,322,654 | B2 * | 12/2012 | Gomes | B64C 1/1423 244/118.5 |
| 8,568,585 | B2 * | 10/2013 | Nolan | C02F 1/006 137/625.18 |
| 2007/0102370 | A1 * | 5/2007 | Hoffjann | B64D 11/02 210/748.16 |
| 2012/0261352 | A1 * | 10/2012 | Kawasaki | C02F 1/006 210/743 |
| 2013/0305444 | A1 * | 11/2013 | Boodaghians | E03D 5/003 4/323 |
| 2014/0059754 | A1 * | 3/2014 | Hermon | E03D 5/003 4/318 |
| 2014/0138326 | A1 * | 5/2014 | Boodaghians | C02F 1/001 210/791 |
| 2015/0000749 | A1 * | 1/2015 | Holmes | B64C 1/067 137/1 |
| 2015/0361648 | A1 * | 12/2015 | Boodaghians | E03D 5/01 4/354 |
| 2016/0107111 | A1 * | 4/2016 | Boodaghians | F04B 43/04 137/15.01 |

OTHER PUBLICATIONS

International Patent Application No. PCT/US2013/050608, International Preliminary Report on Patentability dated Jan. 29, 2015.

* cited by examiner

SYSTEMS AND METHODS FOR TREATING GREY WATER ON-BOARD PASSENGER TRANSPORT VEHICLES

CROSS REFERENCE TO RELATED APPLICATIONS

This application claims the benefit of U.S. Provisional Application Ser. No. 61/672,826, filed Jul. 18, 2012, titled "Systems and Methods for Conversion of Grey Water to Potable Water," the entire contents of which are hereby incorporated by reference.

FIELD OF THE INVENTION

Embodiments of the present invention relate generally to treatment systems and accompanying logic for determining how and to what extent spent or used (i.e., grey) water is treated on-board a passenger transport vehicle.

BACKGROUND

Water is an expensive resource to store aboard passenger transport vehicles, such as aircraft, due to its high density and large volume of consumption on flights, especially international flights. For example, on-board a B777 sized aircraft tasked with a 10 hour mission, passenger use of potable water from sink faucets accounts for about 135 gallons of water pouring down lavatory sinks each flight, which accounts for about 40% of in-flight water consumption. This water is generally referred to as "grey water," which refers to water that has been soiled but that does not contain sewage or "black water." Grey water is the spent or used water that has been used for hand-washing, and may contain contaminants such as soaps or other detergents.

A method or system to recycle grey water would be of benefit to airlines in many capacities. For example, it would reduce the overall consumption of water; it would reduce the mass of the water required to be carried per flight, which could generate the ability to carry alternate payload instead of water; and it would allow the airline to tout itself as environmentally-friendly and as interested in conservation of resources. Modern technologies to produce potable water from grey water have not been designed for aircraft use; they tend to be heavy and large or treatment takes far too long for the 10 hour flight-time of even a long haul mission. The principles of municipal water treatment have been used to design a small scale treatment unit, sized for vehicle lavatories. Suspended solids, typically removed via gravity in large sedimentation pools, will be removed utilizing grey water filtration technology. The chemicals contributing to biochemical oxygen demand (BOD) will be removed quickly by a small scale biological trickling filter as opposed to the large scale degradation that occurs in municipal aeration tanks. Final clarification steps will be completed using further filtration and activated carbon, and a disinfection step utilizing UV will replace the large sedimentation and chlorine contact basins used to polish municipal water.

The present inventors have thus sought to develop a grey to potable water system with the potential to overcome these issues and to reduce the weight of each flight by significant amounts, while simultaneously cutting grey water waste.

BRIEF SUMMARY

Embodiments of the invention described herein thus provide a system to cleanse grey water through a series of treatment steps, and then to use the new potable water again in the faucet and/or toilet. (It is also envisioned that the water could be treated sufficiently to be delivered to an on-board coffee maker or for other potable water usage.) In this way, a set water volume per lavatory can be used continuously for the duration of a flight. The system functions via a cascade of logic commands given by a series of electronic controllers, valves, and sensors which are fine-tuned to supply enough water to each component of the system.

The system may also include logic that determines how and to what extent the grey water is to be treated on-board a passenger transport vehicle. During busy lavatory times on the flight, some grey water may be treated to a lesser extent and delivered to the toilet for use as flush water, while other grey water may be treated to a higher sanitary standard level and delivered to the sink for hand washing water. As another example, during high water usage times in the galley (such as take-off and meal times, when coffee and/or espresso is brewed), the grey water may be treated to become potable water quality and delivered to the galley. The logic can determine how and when the treatment should occur, based on flight times, and/or water levels in the various treatment stacks.

DETAILED DESCRIPTION

Figure 1:
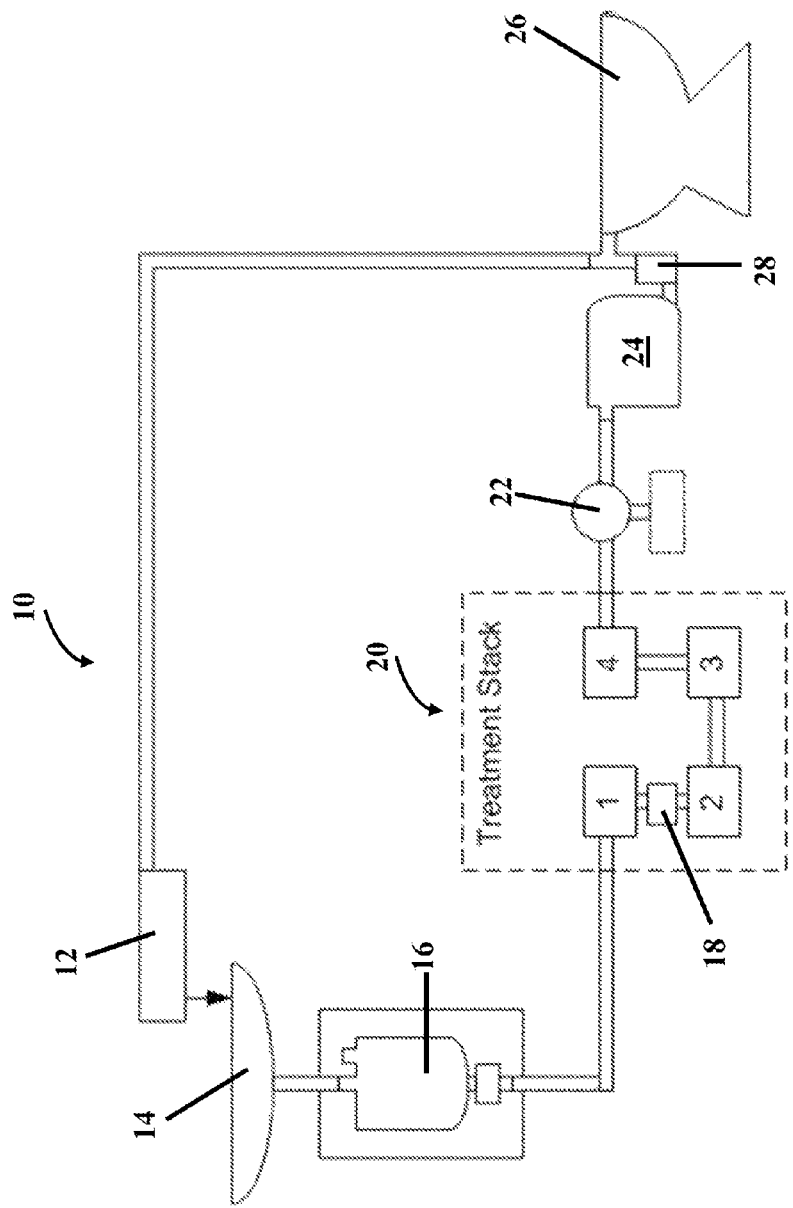
FIG. 1 shows a schematic of a water treatment stack according to one embodiment of this invention.

The general workflow of one embodiment of the grey water conversion system 10 is shown in FIG. 1. Water used to wash one's hands, face, etc. comes from the faucet 12 and is subsequently drained from the sink 14. This water is then stored in a grey water accumulator 16 until an electronic signal is given for the contents of the accumulator 16 to be treated. The grey water can be either constantly pressurized by a pump 18 (shown in the Treatment Stack 20) or pressure can be delivered on demand. In either case, a valve is opened to release the grey water into a Water Treatment Stack (WTS) 20. This treatment stack 20 contains a series of water purification steps to convert the grey water to re-usable (and in some instances, potable) water that is NSF compliant for relevant safety standards.

The primary treatment will consist of a filtration step 1 in order to remove large suspended solids and foamed soaps. Filter media will be designed to allow ample flow while preserving sufficient filtration of grey water. A media filtration module may require periodic backwashing in order to remove filtered debris and recharge media. This maintenance can be scheduled alongside the regular fill and drain of the water and waste systems when aircraft is docked. As aircraft maintenance can be costly, it is desirable to maximize the time between filter cleaning or replacement. One measure to increase filter lifetime is to utilize the available vacuum in the vacuum waste system to backwash the filter media.

A biological media column, step 2, will be utilized to react with remaining suspended and dissolved organics to further treat the grey water influent. Influent will enter the top of the column and trickle down through the media via gravity. The media will ensure a tortuous path for the grey water and ensure sufficient contact time. The media supports the growth of beneficial microbial systems which sorb significant amounts of dissolved organic material from the influent as food substances. A clarifying cache is utilized to capture any sloughed microbial growth.

Remaining suspended solids and macromolecules will be removed as the influent passes through a series of membrane filters 3. Head loss (which is the measure of the reduction in the total head of liquid as it moves through the system) of water from the previous treatment steps will be addressed with a pump sized for the anticipated demand and necessary head pressure.

While the majority of organic molecules will have been filtered out at this point in the treatment process, the possibility of pathogenic transfer cannot be ignored. Sterilization of any organics will thus be achieved using a UV or UV/Photocatalytic system 4. Residence time and UV intensity will be optimized for maximum efficacy and minimal power consumption.

When the water exits the final step of the treatment stack, it is desirably considered to be potable. As an added safety measure, this water may be tested for quality, again in relation to NSF standards, at the water quality sampling unit 22. Rapid quality measurements will be used to justify treated water quality and safety. If the water is not compliant with the set standards, then a halt can be placed on the further use of this recycled water, and the direct fresh water reservoir may be used instead. Furthermore, an alert can be sent to the crew/maintenance staff aboard the aircraft to notify them that there is an issue with the water filtration system so that the necessary measures can be taken to either fix the problem or quarantine it from contaminating passengers aboard the aircraft. Alternatively, this water may be delivered to a flush water accumulator tank, as described further below. If the water does pass the water quality sampling step, it will safely pass through to the potable water accumulator 24 without tripping any alarms.

Similar to the functionality of the grey water accumulator 16, the potable water in its respective accumulator 24 will sit idle until it is needed by another module in the system; in this case, either the faucet 12 or toilet 26. Similar to the grey water accumulator tank 16, the fresh water can either be under constant pressure from a pump 28 or an on-demand system can be used. In either case, when a valve is opened to direct the cleaned water to the faucet 12 or toilet 26, the potable water is driven by pressure to the desired destination.

Figure 2:
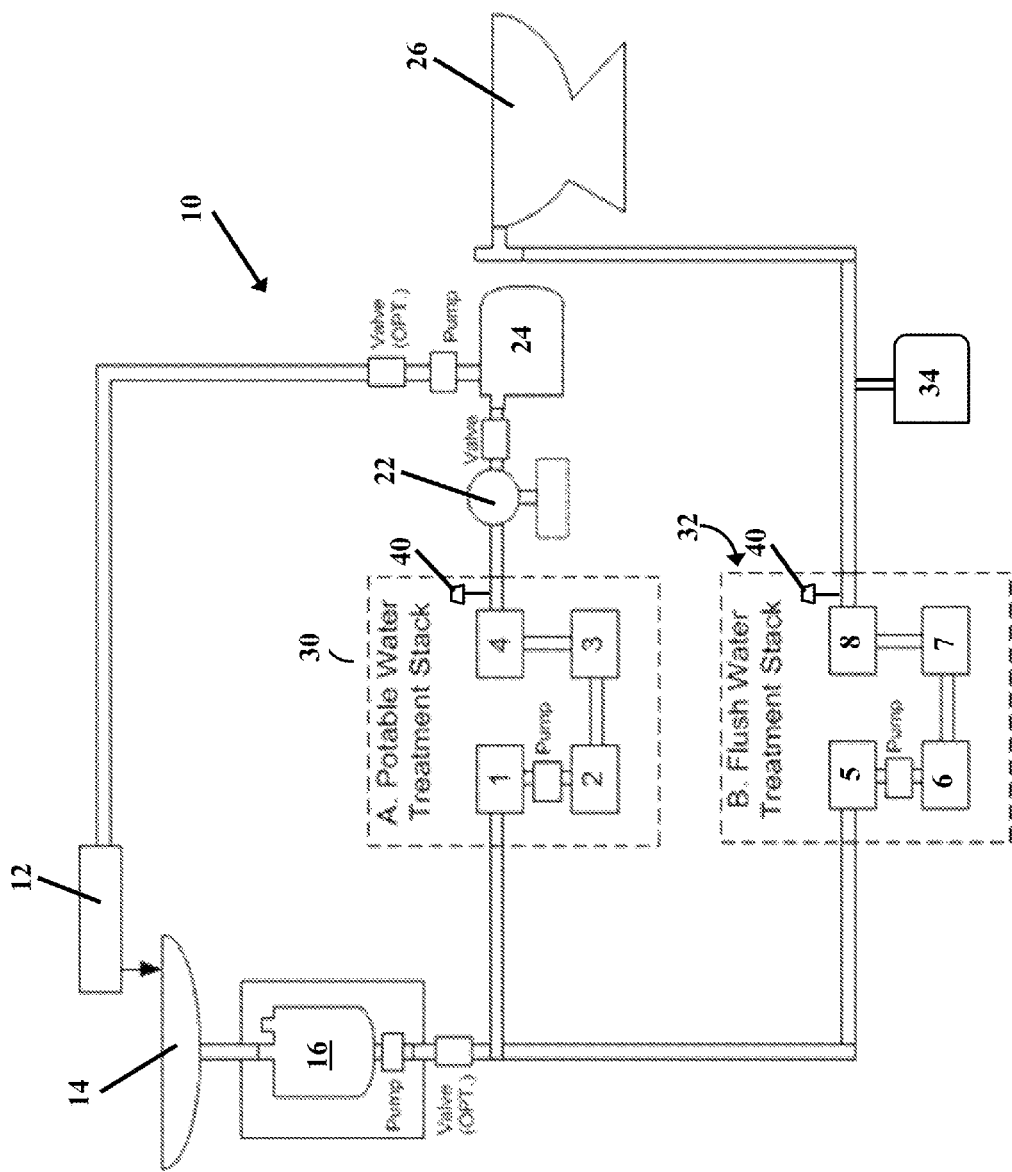
FIG. 2 shows a schematic of an alternate water treatment stack configuration according to another embodiment of this invention.

In an alternative embodiment shown in FIG. 2, the water is stored in the grey water accumulator 16 and diverted to either the Potable Water Treatment Stack A (PWTS A) (30) or to the Flush Water Treatment Stack B (FWTS B) (32). The PWTS 30 functions as described above with respect to FIG. 1. FWTS (Stack B) 32 is merely superficial treatment of the water to make it presentable in a toilet setting. In this respect, the water does not need to be potable and thus the potable water treatment stack's resources can be preserved to make more potable water available to passengers on the flight. The Flush Water Treatment Stack 32 can consist of one or more water treatments, including but not limited to odor reduction, particulate elimination, and color transformation (which may be referenced as steps 5, 6, 7, and/or 8 on FIG. 2). A treated flush water accumulator 34 may be used to store the treated flush water, if it is not needed for immediate use. Examples of various types of systems for using, storing, and treating grey water for its grey water flush systems are described in various co-pending applications of the assignee.

The system 10 will continuously run by cleaning and transporting water as needed between the sink 14, grey water accumulator 16, treatment stacks 30 and 32, and potable water accumulator 24 and/or treated flush water accumulator 34. This allows an aircraft to identify a particular amount of water to be used for a particular lavatory, such that one set amount of water flows through the lavatory and its accompanying treatment stacks, without any further water being needed. This closed system can greatly reduce the water load required to be carried. For example, the initial allotted amount of water for both hand washing/sink water and flush water may be determined, and the same amount of water continues to flow through the system 10.

However, there is the possibility that water may be lost from the system due to spills, evaporation, toilet flushes, etc. In these cases, this water needs to be replenished so as to preclude the failure of the system due to lack of water. A sensor may be provided to signal a controller to automatically replace lost water into the system 10. This water may be pulled from the main on-board water tank. It is generally desirable for one grey water treatment loop to maintain a general equilibrium total water volume. (The sensor is to detect the level of water available in the grey water reservoir may be mounted to the reservoir wall and may use a sensing technology and design that maximizes accuracy and reliability. For example, a non-intrusive capacitive level sensor may be mounted to the gray water reservoir walls so as to preclude exposure to potentially corrosive influents and provide accurate liquid levels.)

Accordingly, treatment stacks and plumbing architecture may be designed for a single lavatory, in order to create a water flow path that will support that lavatory for an entire flight or for a portion of a flight, depending upon the size of the lavatory, aircraft, and/or flight time. In another embodiment, the system may be sized to serve all lavatories in a localized lavatory complex, such that multiple pipes may be added to deliver the treated water from either the PWTS 30 or the FWTS 32 to the sinks and toilets of near-by lavatories.

Figure 3:
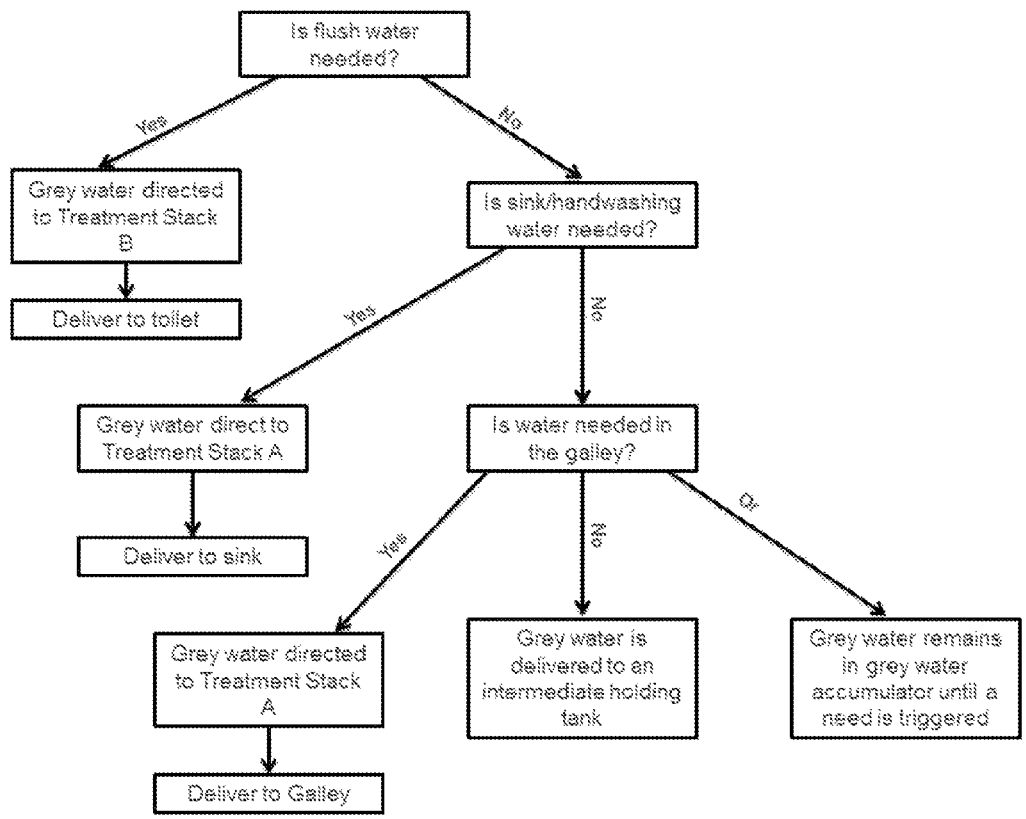
FIGS. 3 and 4 show logic flowcharts, guiding the flow of grey water depending upon various factors.

In a further embodiment, there is provided a logic system that instructs the grey water accumulator 16 where to deliver the grey water to be treated, i.e., whether the water should go to PWTS 30 or to the FWTS 32. A schematic of one type of logic is provided in FIG. 3. There may be provided a water level sensor 40 in each of the stacks 30, 32, which indicates the water level and can be programmed to determine the desired amount of water for optimal usage flow. If flush water is needed, then the water is routed to the Treatment Stack B (the FWTS 32). The water may be treated more quickly in this stack because fewer steps are required, and the treated water is delivered to the toilet for use as flush water. If, however, flush water is not needed at that point, which can be determined by a water level sensor in each treatment stack or via the alternate logic system shown in FIG. 4, then the logic system inquires as to whether sink/hand washing water is needed. If it is, then the water is directed to Treatment Stack A (the PWTS 30). The water is treated here to be sufficient for use as hand-washing water, meaning that it need not be entirely potable, i.e., drinkable, as one would not typically drink sink water, but it is sufficiently treated for use as hand-washing water, such that it is bacteria-free and clear. This can be determined in a number of ways. For example, in one embodiment, the water quality sampling system may be set to indicate a cleanliness level, e.g., potable or if not completely potable, then sufficient for uses other than drinking, but water that has been treated to a higher degree than flush water.

If sink/hand washing water is not needed, then the logic system inquires as to whether water is needed in the galley, for example, for coffee or espresso brewing. If it is, then the water is directed to Treatment Stack A (the PWTS 30). The water can be treated to an even higher quality if desired, by delivering the water through an extra treatment step in order to ensure that the water is sufficiently potable. This is again determined by the water quality sampling step. The water is then routed to the galley. If water is not needed in the galley at that time, then the grey water can be delivered to an intermediate grey water holding tank (not shown, but generally positioned away from the lavatory for space-saving reasons) or it may remain in the grey water accumulator 16 (under or near the sink) until a need is triggered.

Figure 4:
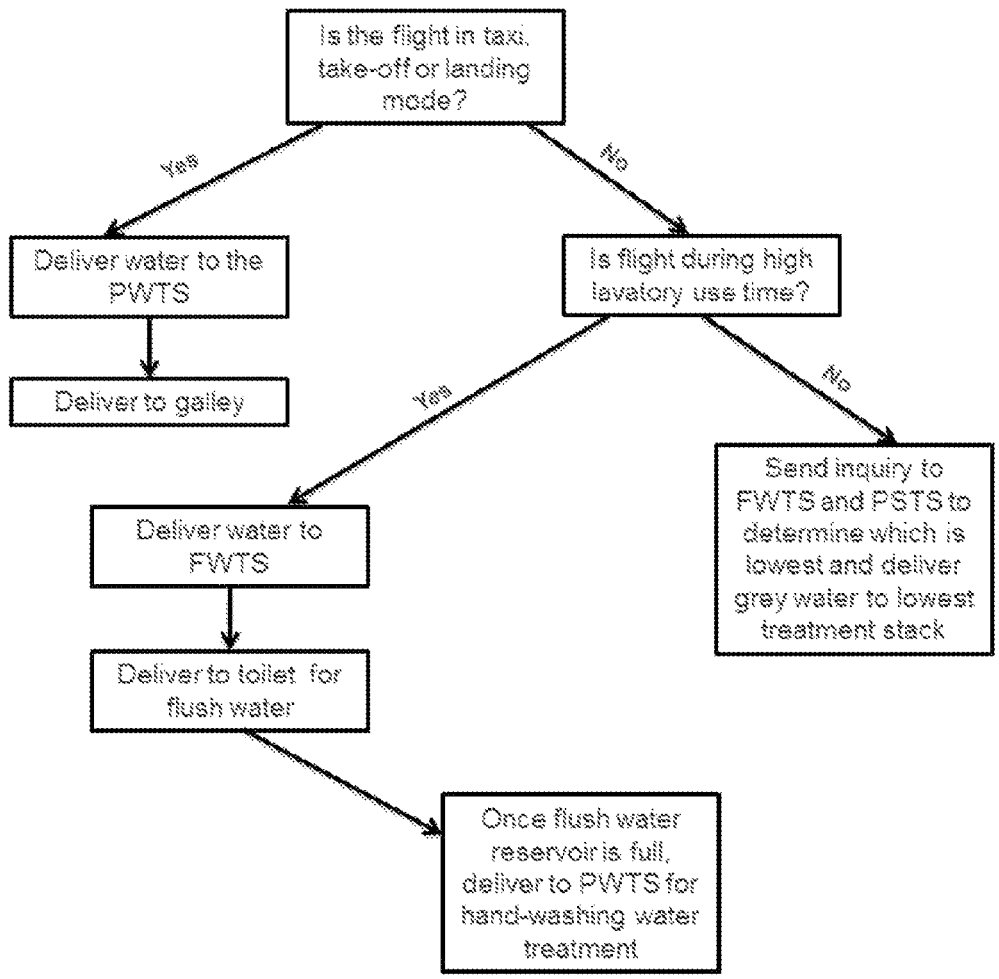

An alternate logic system is provided in FIG. 4, and this logic is based on flight timing, rather than specific water needs. Depending upon what events are generally occurring in the flight schedule, the system determines and decides where to send the water based on pre-programmed knowledge about general user needs at those times. For example, during taxi, take-off and landing, the lavatories are closed, so the need for flush water and hand-washing water is generally low. However, the need for water for coffee brewing is typically higher at those times. By contrast, once the captain turns off the "fasten seat belt" sign, passengers often get up to use the lavatories, which means there will be an increased need for flush water. Similarly, during meal service, passengers generally remain seated, but extra water may be needed in the galley at this time. Then, passengers also get up to use lavatories after meals have been served. This is another high use time when water can be routed back to the FWTS.

Although the PWTS is able to treat water to be completely potable and drinkable, it may be desirable to provide varying levels of treatment, with the highest level of treatment being delivered to the water intended for galley use. If desired, a third treatment stack may be added to the system, which can have an even higher water quality sampling standard for galley use.

While the foregoing written description of the invention enables one of ordinary skill to make and use various embodiment of the invention, those of ordinary skill will understand and appreciate the existence of variations, combinations, and equivalents of the specific embodiments, methods, and examples herein. Changes and modifications, additions and deletions may be made to the structures and methods recited above and shown in the drawings without departing from the scope or spirit of the invention and the following claims.

What is claimed is:

1. A water flow and treatment system for a passenger transport vehicle having a lavatory, the lavatory having a sink and a toilet, the system comprising:
   (a) a grey water accumulator positioned to capture used hand washing water from the sink;
   (b) a first water treatment stack configured to receive at least a portion of the used hand washing water from the grey water accumulator and to treat the water to a first desired quality level;
   (c) a water quality sampling system associated with the first water treatment stack and configured to sample exiting water;
   (d) a flush water treatment stack configured to receive at least a portion of the used hand washing water from the grey water accumulator and to treat the water to a second desired quality level that is lower than the first desired quality level;
   (e) the first water treatment stack delivering its exiting water to a location requiring a higher level of quality than toilet flush water;
   (f) the flush water treatment stack delivering its exiting water for use as toilet flush water; and
   (g) a logic system for determining water needs on board the passenger transportation vehicle and for directing water in the grey water accumulator to the first water treatment stack or to the flush water treatment stack based on determined water needs, the logic system comprising a controller for routing water to respective treatment stacks based on information provided by one of (i) water level sensors in the first water treatment stack and the flush water treatment stack, wherein when water levels are sensed as low in one of the treatments stacks, water from the grey water accumulator is directed thereto or (ii) flight events.

2. The system of claim 1, wherein a single lavatory has a single water flow and treatment system.

3. The system of claim 1, wherein one water flow and treatment system services more than one lavatory.

4. The system of claim 1, wherein the passenger transport vehicle comprises an aircraft.

5. The system of claim 1, further comprising a valve configured to deliver water to either the first water treatment stack or to the flush water treatment stack, depending upon water needs.

6. The system of claim 1, wherein the controller delivers water to either the first water treatment stack or to the flush water treatment stack based on information delivered by a first water level sensor in the first water treatment stack, a second water level sensor in the flush water treatment stack, or both.

7. The system of claim 6, wherein the water needs are determined by the first and second water level sensors.

8. The system of claim 1, wherein the water needs are determined by flight events.

9. A method of managing water flow on board a passenger transport vehicle, comprising:
   (a) providing a system comprising a grey water accumulator positioned to capture used hand washing water from a lavatory sink;
   a first water treatment stack configured to receive water from the grey water accumulator and to treat the water to a first desired quality level;
   a water quality sampling system associated with the first water treatment stack and configured to sample exiting water;
   a flush water treatment stack configured to receive water from the grey water accumulator and to treat the water to a second desired quality level that is lower than the first desired quality;
   a first water level sensor in the potable water treatment stack;
   a second water level sensor in the flush water treatment stack, and
   a control logic system that determines whether to send water to the potable water treatment stack or to the flush water treatment stack based upon water needs;
   (b) determining whether water in the grey water accumulator should be delivered to the first water treatment stack or to the flush water treatment stack based on water levels sensed by the first and second water level sensors; and (c) instructing delivery of water in the grey water accumulator to either the first water treatment stack or to the flush water treatment stack.

10. The method of claim 9, wherein water in the grey water accumulator is sent to the potable water treatment stack or to the flush water treatment stack, depending upon which treatment stack has a lower water level.

11. The system of claim 1, wherein water in the grey water accumulator is sent to the first water treatment stack or to the flush water treatment stack, depending upon which treatment stack has a lower water level.

12. A method of managing water flow on board a passenger transport vehicle, comprising:
(a) providing a system comprising a grey water accumulator positioned to capture used hand washing water from a lavatory sink,
a first water treatment stack configured to receive water from the grey water accumulator and to treat the water to a first desired quality level;
a water quality sampling system associated with the first water treatment stack and configured to sample exiting water;
a flush water treatment stack configured to receive water from the grey water accumulator and to treat the water to a second desired quality level that is lower than the first desired quality; and
a control logic system that determines whether to send water to the potable water treatment stack or to the flush water treatment stack based upon water needs;
(b) determining whether water in the grey water accumulator should be delivered to the first water treatment stack or to the flush water treatment stack based on flight events; and
(c) instructing delivery of water in the grey water accumulator to either the first water treatment stack or to the flush water treatment stack.

* * * * *